United States Patent
Francis et al.

(10) Patent No.: US 12,353,925 B2
(45) Date of Patent: Jul. 8, 2025

(54) ALLOCATING COMPUTE NODES AS STORAGE IN A POWER-CONSTRAINED ENVIRONMENT

(71) Applicant: Microsoft Technology Licensing, LLC, Redmond, WA (US)

(72) Inventors: Robert Binneweg Francis, Bothell, WA (US); Jeffrey Edwin Shipman, Redmond, WA (US); Samer Arafeh, Sammamish, WA (US); Nicholas James Anderson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 816 days.

(21) Appl. No.: 17/412,960

(22) Filed: Aug. 26, 2021

(65) Prior Publication Data

US 2023/0061637 A1    Mar. 2, 2023

(51) Int. Cl.
G06F 9/50    (2006.01)

(52) U.S. Cl.
CPC .......... G06F 9/5094 (2013.01); G06F 9/5033 (2013.01); G06F 9/5044 (2013.01)

(58) Field of Classification Search
None
See application file for complete search history.

(56) References Cited

U.S. PATENT DOCUMENTS

| | | |
|---|---|---|
| 6,925,573 B2 | 8/2005 | Bodas |
| 8,533,103 B1 | 9/2013 | Certain et al. |
| 9,465,952 B2 | 10/2016 | O'Hare et al. |
| 10,877,553 B2 | 12/2020 | Mugunda et al. |
| 10,884,984 B2 | 1/2021 | Maybee et al. |

(Continued)

FOREIGN PATENT DOCUMENTS

| | | |
|---|---|---|
| CN | 102929363 A | 2/2013 |
| JP | 2006338378 A | 12/2006 |

OTHER PUBLICATIONS

R. Tudoran, A. Costan and G. Antoniu, "DataSteward: Using Dedicated Compute Nodes for Scalable Data Management on Public Clouds," 2013 12th IEEE International Conference on Trust, Security and Privacy in Computing and Communications, Melbourne, VIC, Australia, 2013, pp. 1057-1064 (Year: 2013).*

(Continued)

*Primary Examiner* — Frank D Mills
(74) *Attorney, Agent, or Firm* — RAY QUINNEY & NEBEKER P.C.; John O. Carpenter

(57) ABSTRACT

A method for managing storage and computational resources in a datacenter includes obtaining a power delivery limit for a rack power supply delivering power to the plurality of computing devices and measuring a resource telemetry for the first computing device and second computing device in the server rack. In response to measuring a power draw of the server rack above a power threshold value of the power delivery limit, the method includes allocating the second computing device of the server rack as a storage server to the first computing device. The method occurs at a server rack including a plurality of computing devices. A first computing device and a second computing device are in network communication with one another. Each of the first computing device and second computing device include a processor and a hardware storage device.

20 Claims, 6 Drawing Sheets

(56) References Cited

U.S. PATENT DOCUMENTS

| | | | |
|---|---|---|---|
| 2003/0105903 A1 | 6/2003 | Garnett et al. | |
| 2004/0268166 A1 | 12/2004 | Farkas et al. | |
| 2014/0277807 A1 | 9/2014 | Mick et al. | |
| 2015/0273329 A1* | 10/2015 | Saito | A63F 13/35 463/42 |
| 2017/0106280 A1* | 4/2017 | Pajaro | A63F 13/44 |
| 2017/0257272 A1* | 9/2017 | Bauer | H04L 41/12 |
| 2017/0322613 A1* | 11/2017 | Lin | G06F 1/3234 |
| 2018/0157532 A1 | 6/2018 | Kumar et al. | |
| 2018/0240163 A1 | 8/2018 | Sivasubramanian et al. | |
| 2019/0050036 A1* | 2/2019 | Hall | G05B 19/042 |
| 2021/0034436 A1* | 2/2021 | Tian | G06F 9/45558 |

OTHER PUBLICATIONS

M. Badiei, X. Zhan, R. Azimi, S. Reda and N. Li, "DiBA: Distributed Power Budget Allocation for Large-Scale Computing Clusters," 2016 16th IEEE/ACM International Symposium on Cluster, Cloud and Grid Computing (CCGrid), Cartagena, Colombia, 2016, pp. 70-79. (Year: 2016).*

O. O. Ajibola, T. E. H. El-Gorashi and J. M. H. Elmirghani, "Energy Efficient Placement of Workloads in Composable Data Center Networks," in Journal of Lightwave Technology, vol. 39, No. 10, pp. 3037-3063, May 15, 2021 (Year: 2021).*

"International Search Report and Written Opinion issued in PCT Application No. PCTUS22038110", Mailed Date: Jan. 26, 2023, pp. 11.

Sheldon, Robert, "HPC services bring computational power to more organizations", Retrieved from: https://searchdatacenter.techtarget.com/feature/Want-an-HPC-data-center-Colocation-couldbe-the-answer, Mar. 16, 2020, 3 Pages.

* cited by examiner

ALLOCATING COMPUTE NODES AS STORAGE IN A POWER-CONSTRAINED ENVIRONMENT

BACKGROUND

Background and Relevant Art

Bespoke, high-density server blades used for compute-heavy workloads (gaming, machine learning, etc.) may exceed the power and thermal limits of general-purpose server hardware. Such compute-heavy blades may have multiple servers, graphical processing units (GPUs), or application specific integrated circuits (ASICs) per blade chassis but slot into a conventional server rack design, which may be intended or designed for more moderate power-consuming blade configurations. For specialized, compute-heavy blade configurations to operate within the thermal and power constraints of conventional rack systems, aggressive power management strategies, like idling or powering off a proportion of servers, are required.

BRIEF SUMMARY

In some embodiments, a method for managing storage and computational resources in a datacenter includes obtaining a power delivery limit for a rack power supply delivering power to the plurality of computing devices and measuring a resource telemetry for the first computing device and second computing device in the server rack. In response to measuring a power draw of the server rack above a power threshold value of the power delivery limit, the method includes allocating the second computing device of the server rack as a storage server to the first computing device. The method occurs at a server rack including a plurality of computing devices. A first computing device and a second computing device are in network communication with one another. Each of the first computing device and second computing device include a processor and a hardware storage device.

In some embodiments, a method for managing storage and computational resources in a datacenter includes, at a control plane, receiving a first communication from a first computing device and a second communication from a second computing device. At least the first computing device is located in a server rack. The method further includes obtaining a power supply limit for the server rack, creating a device inventory with device IDs for the first computing device and second computing device, and obtaining a power draw telemetry for the first computing device and a total power draw for the server rack. In response to measuring the total power draw above a power threshold value of the power supply limit and a power draw telemetry for the first computing device above a device power threshold value, the method further includes determining if the second computing device is within the server rack and allocating the second computing device as a storage server to the first computing device.

In some embodiments, a system for managing storage and computational resources in a datacenter includes a control plane including a processor and hardware storage device in data communication with the processor. The hardware storage device has instructions stored thereon that, when executed by the processor, cause the control plane to receive a first communication from a first computing device and a second communication from a second computing device, where at least the first computing device is located in a server rack. The instructions further cause the control plane to create a device inventory with device IDs for the first computing device and second computing device and create a data inventory associated with the device inventory. The control plane receives a request from a user to play a game application at the first computing device, locates the game application on the second computing device, and allocates the second computing device as a storage server of the first computing device.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 7-1 is a graph showing low-power applications in a server blade, according to at least some embodiments of the present disclosure;

FIG. 7-2 is a graph showing a computing device of a server blade executing a high-power application, according to at least some embodiments of the present disclosure;

DETAILED DESCRIPTION

The present disclosure relates generally to systems and methods for power and data management in a datacenter. More particularly, the present disclosure relates to re-using idled compute nodes in a power-constrained environment. In conventional datacenters, electronic devices are shut down, throttled, disabled, or otherwise limited in response to power demands of the electronic devices exceeding the power supply limit of a server.

In some embodiments, the computing devices of a server rack have a maximum power consumption that exceeds a power supply limit of the server rack. The computing devices, if all operating at maximum capacity, will require more power than the power supply of the server rack can provide, causing a reduction in performance or failure of the computing device. In a datacenter environment, remote users may be interacting with the computing devices in real-time. Degradation of performance and/or shutdown of the computing devices is therefore undesirable. To ensure a quality experience for users, conventional datacenters and/or server racks can power cap, throttle, or disable some devices to manage the power consumption of the server rack as a whole. However, in some instances, such as cloud-based gaming (such as AMAZON LUNA, GOOGLE STADIA, PLAYSTATION NOW, MICROSOFT XBOX CLOUD GAMING, etc.), application or data that is requested by the user is not stored in the integrated hardware storage at the computing device. Rather, under low-demand conditions, a second computing device may stream the application or other data to the first computing device, and the first computing device may run the application or process the data.

Figure 1:
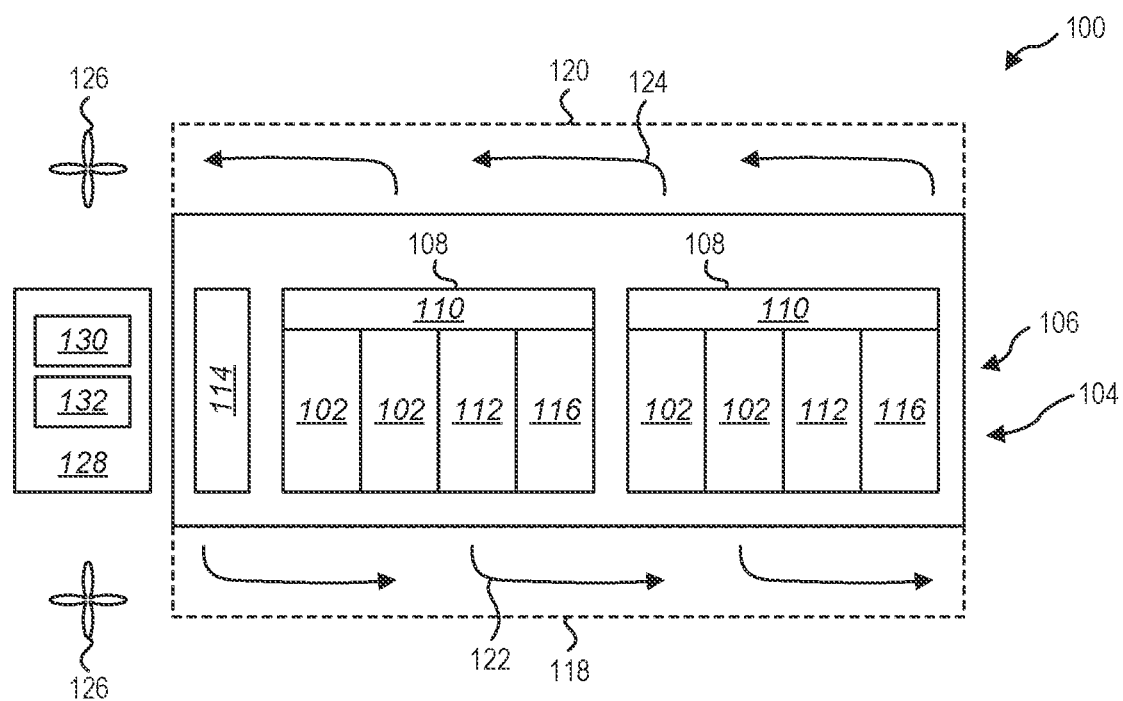
FIG. 1 is a schematic representation of a datacenter, according to at least some embodiments of the present disclosure.

FIG. 1 is a schematic representation of a datacenter 100. In some embodiments, the datacenter 100 includes server blades 102 in a climate-controlled room 104. The server blades 102 are arranged in a row 106, where the row 106 contains a plurality of server racks 108, each of which contain at a plurality of server blades 102, power supplies 110, networking devices 112, and other electronic devices. In some examples, the server blade 102 includes a plurality of computing components. In some examples, the server computers are complete computers (e.g., each server computer can function as a standalone computer). In some examples, the server blades 102 include one or more computing devices that can cooperate to provide scalable computational power.

The server row 106 can include a row manager 114 that is in communication with the server racks 108 and/or rack manager 116 of the server row 106. In some embodiments, the row manager 114 controls computational loads, such as process allocations, of the server racks 108 and/or server blades 102. In doing so, the row manager 114 may control, at a high-level, the amount of power demanded of the power supply 110 by the server blades 102 of the server racks 108.

In datacenters where the server blades 102 house compute power that would, when operating at or near compute capacity, exceed the capacity of the power supply 110, the row manager 114 and/or rack manager 116 would conventionally power down or cap one or more of the computing devices or server blades 102 in the row 106. In some embodiments according to the present disclosure, one or more computing devices of the server rack 108 or row 106 may be allocated as a lower power demanding storage server to another computing device that is operating at or near compute capacity. The datacenter 100 can thereby use the power supply capacity, storage capacity, and compute capacity of the available devices more efficiently.

In some instances, the power supply 110 may be capable of providing sufficient power to the server blades 102 when the computing devices of the server blades 102 are operating at or near compute capacity, but the amount of heat generated by the server blades 102 when operating at or near compute capacity may exceed the thermal management capacity of the datacenter 100 or room 104.

In some embodiments, the row manager 114 controls thermal management of the server racks and/or server computers. For example, the row manager 114 can manage active thermal management for the server racks 108 and/or server blades 102 by changing fan speed or by controlling the flow rate of a cooling fluid for liquid cooling systems. In at least one example, the server row 106 is at least partially cooled by a liquid cooling system that delivers cooling fluid to the server racks 108 of the server row 106. The row manager 114 is in communication with the cooling fluid pump to change or stop the flow of cooling fluid.

A server rack 108 can support a plurality of server blades 102 in the rack. The server computers may each have liquid cooling, such as localized immersion cooling for at least some electronic components of the server computer, or a cooling plate with recirculating cooling fluid to cool the electronic component(s) of the server computer. In some embodiments, the server blades 102 or other electronic devices may be air-cooled, utilizing a cold aisle 118 and a hot aisle 120 that flow colder air 122 from the cold aisle 118 and evacuate hotter air 124 from the electronic devices through the hot aisle 120. The air flows from the cold aisle 118 to the hot aisle 120 based on air pressure differentials established by pumps or fans 126 of the thermal management system in series with the cold aisle 118 and the hot aisle 120.

In some embodiments, the electronic components, such as server blades 102, of the server rack 108 are in data communication with a rack manager 116. The rack manager 116 may control power delivery to the server blades 102 or other electronic components. In conventional server arrays, the rack manager 116 may communicate with the server blades 102 or other electronic components to disable, power cap, or throttle the server blades 102 or other electronic components and manage power draw. The rack manager 116, in some embodiments, is also in communication with a cooling fluid pump that moves cooling fluid to one or more server computers or other electronic components in the server rack.

A control plane 128 or other service manager may be in data communication with one or more of the server blades 102 (and components thereof), the power supply 110, the network device 112, the row manager 114, and/or rack manager(s) 116. In some embodiments, the control plane 128 is provided by a processor 130 and a hardware storage device 132. The processor 130 may receive information from the server blades 102 (and components thereof), the power supply 110, the network device 112, the row manager 114, and/or rack manager(s) 116, that allow the processor to perform any of the methods described herein. In some embodiments, the devices in communication with the control plane 128 may receive instructions from the control plane 128 to alter the operation and/or communication of the devices. For example, the control plane 128 may communicate with the server blades 102 and/or the computing devices of the server blades 102 to efficiently use the data and compute resources available on the server blades 102.

The hardware storage device 132 can be any non-transient computer readable medium that may store instructions thereon. The hardware storage device 132 may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media.

The control plane 128 may be local to the datacenter 100 (e.g., on site at the datacenter), local to the row 104, or local to the rack 108 to allow communication between the server blades 102 and the control plane 128. In some embodiments, the control plane 128 is remote to the datacenter 100, allowing the control plane 128 to be housed and/or controlled remotely, such as from a regional datacenter that communicates with the local datacenter 100.

In some embodiments, the control plane 128 includes a set of management services that run in the same or different datacenter. The management services are able to send instructions to the rack managers 116 and onward to the board management controllers (part of the server blades 102) via an internal management plane. In other embodiments, the control plane 128 communicates with the rack managers 116 and server blades 102 directly.

Figure 2:
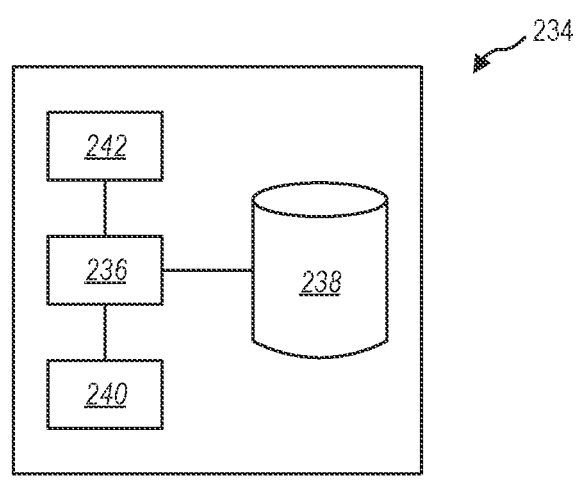
FIG. 2 is a schematic representation of a computing device, according to at least some embodiments of the present disclosure.

FIG. 2 is a schematic representation of a computing device 234 located on a server blade, such as the server blades 102 described in relation to FIG. 1. In some embodiments, the computing device 234 includes at least a processor 236, a hardware storage device 238, and a network device 240. In some examples, the computing device 234 may include additional or dedicated components such as a graphical processing unit (GPU) 242, a central processing unit (CPU), system memory, graphical memory, audio processing unit, physics processing unit, wireless communication devices, or other electronic components or ASICs. The processor 236 is in data communication with the hardware storage device 238 to execute instructions stored on the hardware storage device 238.

In some embodiments, the computing device 234 is or includes gaming computing hardware. For example, the computing device 234 may include one or more processors or hardware storage devices specified in retail commodity video game hardware. The current generation of retail commodity video game hardware (e.g., SONY PLAYSTATION 5, MICROSOFT XBOX SERIES X, etc.) includes high-speed solid-state storage, such as NVMe storage. The NVMe storage is rated for transfers rates, both read and write speeds, that allow the game applications intended for the retail commodity video game hardware to run properly. In other examples, the CPU and/or GPU of the computing device 234 may be the same or similar CPU and/or GPU found in the retail commodity video game hardware to allow the game applications intended for the retail commodity video game hardware to run properly.

However, while the NVMe hard drives allow for high data transfer rates, NVMe hard drives have a relatively low storage capacity compared to other forms of data storage, such as magnetic hard disk drives. Therefore, the individual computing device 234 may be limited in the total storage capacity, and hence the variety of content available on the computing device 234. Similarly, the CPU and/or GPU may have a sufficiently computing capacity to execute the game applications intended for the retail commodity video game hardware, while a power supply of a server rack is unable to provide sufficient power for a plurality of computing devices 234 in the server rack.

The plurality of computing devices 234, while performing less-demanding tasks or less-demanding game applications, may all execute instructions stored locally on a hardware storage device 238 of the computing device 234 and remain independent of other computing devices. For example, some game applications do not require the processor 236 and/or GPU 242 of the computing device 234 to operate at or near power consumption capacity. Each computing device 234 may, in such instances, be allowed to operate independently, as the total power demands of the computing devices remains below the power supply limit.

While the present disclosure describes game applications and gaming usages, it should be understood that the systems and methods described herein are applicable to any use case that requires high computational throughput with scalable storage solutions. For example, machine learning, medical applications, or research applications may require high data throughputs to a powerful compute node that would otherwise be bottlenecked by remote or networked storage devices. To provide high data transfer rates, physically co-locating the computing devices can allow for faster communication rates than accessing the data remotely.

Figure 3:
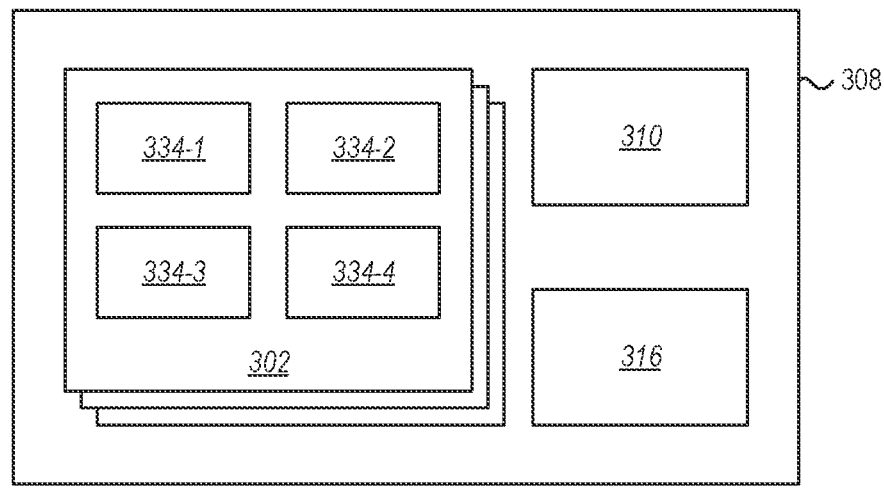
FIG. 3 is a schematic representation of a server rack in a datacenter, according to at least some embodiments of the present disclosure.

FIG. 3 is a schematic representation of four computing devices 334, such as those described in relation to FIG. 2, on a single server blade 302, such as that described in relation to FIG. 1. A server rack 308 may include a plurality of server blades 302, which each have a plurality of computing devices 334 thereon. The combined power demands of the computing devices 334 may exceed the power supply limit of a conventional server rack power supply 310. In conventional instances, the rack manager 316 of the rack 308 may throttle or disable one or more of the computing devices 334 available on the rack 308. However, data stored on the hardware storage device of a second computing device 334-2 may include a game application or data needed by the first computing device 334-1. In such instances, the rack manager 316 disabling the second computing device 334-2 to limit power consumption would also impair the functionality of the first computing device 334-1 for a user connected to the datacenter.

Figure 4:
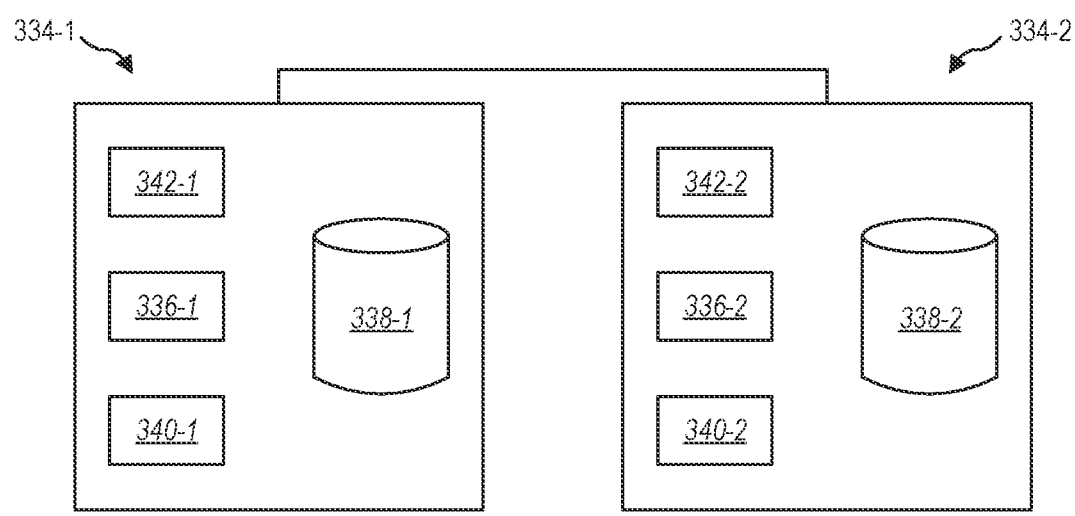
FIG. 4 is a system diagram illustrating communication in a data management system, according to at least some embodiments of the present disclosure.

FIG. 4 illustrates data communication between the first computing device 334-1 and the second computing device 334-2 of FIG. 3. The first computing device 334-1 includes a processor 336-1, a hardware storage device 338-1, a network device 340-1, and a GPU 342-1. The processor 336-1 is in data communication with the hardware storage device 338-1 to execute instructions stored on the hardware storage device 338-1. The second computing device 334-2 includes a processor 336-2, a hardware storage device 338-2, a network device 340-2, and a GPU 342-2. The processor 336-2 is in data communication with the hardware storage device 338-2 to execute instructions stored on the hardware storage device 338-2.

The first computing device 334-1 may access data, such as a game application other software application, or other data, present on the hardware storage device 338-2 of the second computing device 334-1 through the network devices 340-1, 340-2 of the first computing device 334-1 and second computing device 334-2, respectively. The processor 336-1 of the first computing device 334-1 may execute a game application stored on the hardware storage device 338-2 of the second computing device 334-2 without first downloading the game application to hardware storage device 338-1 of the first computing device 334-1. For example, a portion of the game application may be streamed from a non-volatile hardware storage device 334-2 of the second computing device 334-2 to RAM of the first computing device 334-1. Thereby, the first computing device 334-1, when the first computing device 334-1 and second computer device 334-2 are power constrained by the rack power supply, may provide all of the content of both hardware storage devices 338-1, 338-2 while remaining in the power envelope of the rack power supply.

In some embodiments, the bandwidth in and out of the server rack is less than the total of each blade server in the server rack. Therefore, communication within the server blades and between server blades within a rack may encounter less networking bottlenecks than communication between server racks. In at least one example, each blade server has networking bandwidth to support up to 25 Gbps of total data communication to and from the server blade and the devices thereon, while the server rack has a bandwidth cap of 100 Gbps.

Figure 5:
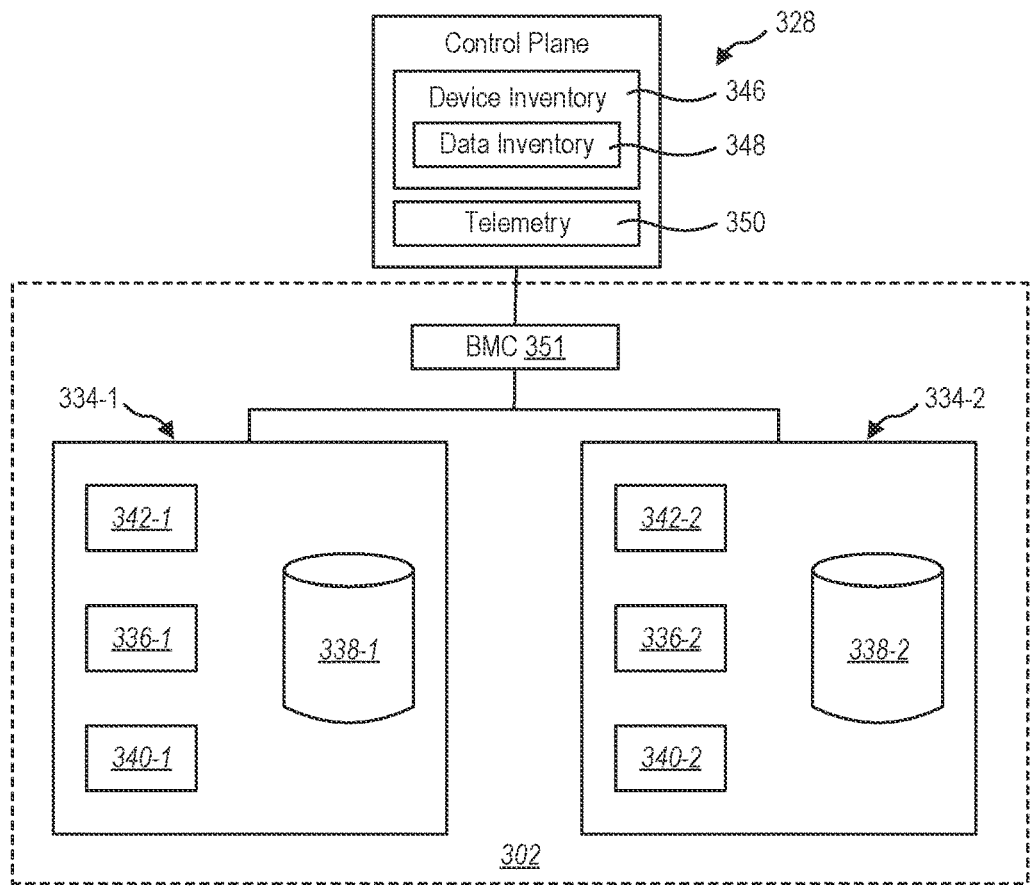
FIG. 5 is a system diagram illustrating control plane management in a datacenter, according to at least some embodiments of the present disclosure.

FIG. 5 is a schematic representation of a control plane 328 managing communication between the first computing device 334-1 and second computing device 334-2 described in relation to FIG. 4. In some embodiments, a control plane 328 can manage virtual machine (VM) and/or process allocation to the computing devices 334-1, 334-2 on a server blade 302, in the server rack, or in a row. In managing the VM and process allocation, the control plane 328 can create a device inventory 346 based on the device identification (IDs) of the computing devices 334-1, 334-2 in communication with the control plane 328. In some embodiments, the device inventory 346 can further include a data inventory 348 to allows for the control plane 328 to know what game applications, software application, or other data is physically stored on which devices in the device inventory 346.

The device inventory 346 may include device IDs and associated device locations for the devices in the network and/or within the datacenter. The device locations include network location information related to the physical proximity of the devices in the device inventory. For example, a first computing device 334-1 and a second computing device 334-2 may be identified within the device inventory 346 as being located on the same server blade 302, in the same rack, in the same row, in the same datacenter, etc.

The data inventory 348 may include software IDs for one or more game applications or software applications. The software IDs or other information in the data inventory 348 may include information about genre, power demands, network demands, etc. of the game application or software application. The data inventory 348 may further include file names, directory names, or other identifying information for the data stored on the devices in the device inventory 346. The data inventory 348 can, therefore, associate the data and/or applications with a network or physical location of the device on which the data is stored. The control plane 334 can determine whether requested data or a requested application is present on the devices controlled by the control plane 328, and the control plane 328 can identify the network or physical location of requested data or application. If the requested data or application is available on a hardware storage device (e.g., 338-1, 338-2), the control plane 328 may use the device inventory 346 to identify the locations of the requested data or application and identify the closest computing device with the requested data or application relative to a computing device that is currently allocated in VM to a user.

System telemetry 350 can assist the control plane 328 in VM and process allocation of the computing devices 334-1, 334-2 and data stored thereon. For example, the control plane 328 or other management service may communicate with the computing devices 334-1, 334-2 and power supply of the rack to measure one or more real-time properties of the computing device(s), the power supply, network switch, or other electronic devices of the server rack, row, or datacenter. The telemetry 350 can include power draw from the computing devices, processor load, memory usage, network usage, temperature, or other properties of the system that reflect performance and operation. In some embodiments, the computing devices 334-1, 334-2 may communicate to the control plane 328 the current application or applications running on the computing device 334-1, 334-2. The telemetry 350 can inform the control plane 328 which devices are consuming the greatest amount of power and which devices have capacity available for processing. The power draw information can allow the control plane 328 to determine when the power draw of the computing device, a server blade, or all of the electronic devices in a rack is approaching or exceeding a power threshold value.

In some embodiments, the telemetry 350 may include network usage. For example, the network switch of the server rack may have less outgoing network connections than internal connections. Therefore, determining which computing devices have the highest network usage can allow the control plane to determine which computing devices to allocate for local (e.g., within the server rack) communication with other computing devices.

In some embodiments, the telemetry 350 includes temperature data that is collected from one or more thermal sensors associated with the server rack, a server blade, a computing device, or a component of a computing device. The temperature data can allow the control plane to determine when the environment or specific components of a computing device are approaching or exceeding a thermal threshold value.

The control plane 328 may communicate with a board management controller (BMC) 351 of the server blade 302. The BMC 351 can monitor and communicate information about server blade status, such as wattage, voltage, temperature, fan speeds, software functions, environmental conditions, etc. while also providing functionalities such as logging, power management, and network communications. In some embodiments, the control plane 328 communicates with the BMC 351 to adjust power to or provide instructions to one or more of the computing devices 334-1, 334-2. In some embodiments, the control plane 328 receives at least a portion of the telemetry 350 from the BMC 351.

Figure 6:
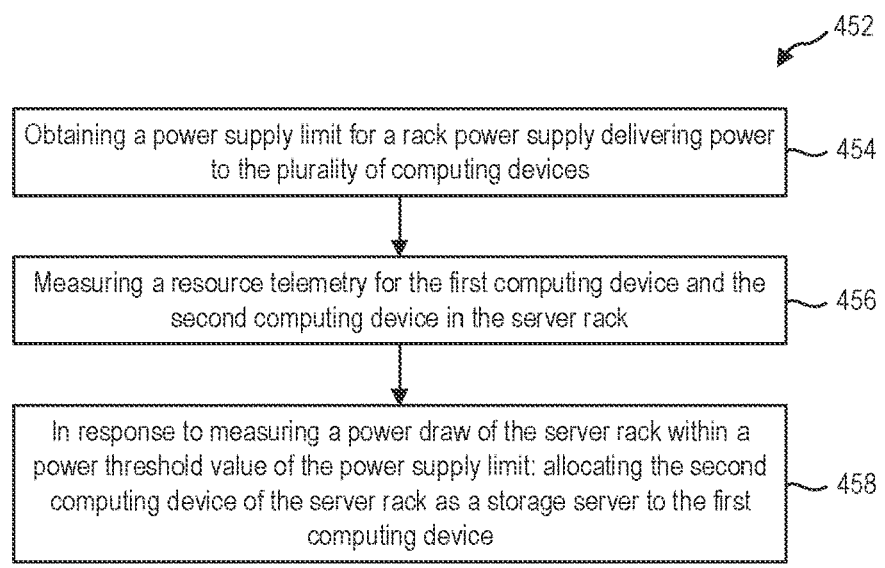
FIG. 6 is a flowchart illustrating a method of data management in a datacenter, according to at least some embodiments of the present disclosure.

Referring now to FIG. 6, in some embodiments, a method 452 of controlling data and compute resources in a datacenter includes allocating a computing device in a server rack to be a storage server for another computing device in the server rack. For example, in a server rack having a first computing device and a second computing device, where both the first computing device and the second computing device have a processor, a hardware storage device, and a network device to allow communication therebetween, the method includes obtaining a power supply limit for a rack power supply at 454. The rack power supply delivers electrical power to the computing devices housed therein, and the rack power supply limit is a maximum wattage that the power supply can sustain to the devices therein. If the demands of the devices in the server rack exceed the power supply limit, the power will be insufficient to support the operation of at least one of the computing devices, causing the computing device(s) to slow, shut down, or fail.

In some embodiments, obtaining the power supply limit includes accessing or parsing a device ID of the power supply or device inventory. The power supply may have a rate power supply limit that is provided by the power supply in communication with a control plane or rack manager. In some embodiments, the power supply limit is a recorded or operator-provided value that is set based on the devices powered by the power supply. For example, the operator-provided limit may be less than the rated power supply limit to provide an additional safety factor when operating the server rack.

The method further includes measuring a resource telemetry for the first computing device and second computing device in the server rack at 456. For example, the resource telemetry may measure or otherwise provide to the control plane a total power draw for the server rack, a power draw from a server blade, a power draw from a specific computing device, or power draw from a specific component of a computing device. In some embodiments, the resource telemetry may measure or otherwise provide to the control plane a temperature of the room, the row, the rack, or one or more computing devices. In some embodiments, the resource telemetry may measure or otherwise provide to the control plane processor usage, memory usage, network usage, or other performance metrics of one or more computing devices.

The resource telemetry may be compared to the power supply limit and, when the resource telemetry indicates that at least one measured property is within a threshold value of a limit, the method includes allocating the second computing device of the server rack to be a storage server with data thereon accessible by the first computing device at 458. For example, when a measured power draw of the server rack is measured within a threshold value of the power supply limit, the second computing device is allocated to be a storage server to the first computing device. As a storage server has lower power demands than a compute node, the average power draw of the computing devices in the server rack is limited.

In another example, a method includes allocating a second computing device to provide data to a first computing device as a storage server to limit power consumption while also leveraging the hardware resources available in the server rack. In some embodiments, the method includes a control plane receiving a communication from a computing device where the communication includes a device ID. The control plane receives the communication and records the device ID and other information in the communication into a device inventory. The device inventory allows the control plane to identify the relative location and resources available in various devices in data communication with the control plane. In some examples, a computing devices sends a communication to the control plane upon startup of the computing device. In at least one example, a server rack with a plurality of computing devices is initialized together, allowing the control plane to receive communications from the plurality of computing devices and create a device inventory for the plurality of computing devices in the server rack.

The communication to the control plane may further includes a software registry, library, or log, that informs the control plane of the applications or other data available on the computing device(s). For example, upon startup, a computing device may communicate with the control plane and inform the control plane of the computing device's network location, physical location, processing resource information, and what applications are stored thereon. The software information allows the control plane to create a data inventory based, in some instances, on the device inventory. The data inventory and device inventory may allow the control plane to find a requested software application or other data on a hardware storage device of the second computing device and instruct the second computing device to stream the application to the first computing device. The first computing device may thereby run a software application not present in the hardware storage device of the first computing device from a local computing device to minimize lag.

In some embodiments, the method includes receiving a request from the first computing device to access requested data. The control plane or other management service may then locate the requested data in the data inventory and allocate the second computing device (e.g., the computing device having the request data stored thereon) as a storage server to the first computing device. In some embodiments, the method further includes running the requested application or processing the requested data with the first computing device.

The requested data may be a software application, such as a game application, that the first computing device can run while the second computing device is allocated as a storage server to the first computing device. For example, when the first computing device and second computing device are present in the same rack or on the same server blade, the first computing device may be able to run the game application from the hardware storage device of the second computing device as though the game application were stored locally on the hardware storage device of the first computing device. Thereby, the second computing device, which would otherwise be idle or disabled by the rack manager to limit total power draw on the rack power supply, can be beneficially used as a relatively low-power storage server to allow another computing device to have, effectively, expanded storage.

In some embodiments, the device power draw of each computing device in a server rack and/or in a device inventory is used to determine when another computing device should be allocated as a storage server. In some examples, allocation of a computing device as a storage server inherently limits the power draw of that computing device, as the possible computational tasks of the storage server draw a comparatively low amount relative to a compute node running a game application. In other examples, the control plane may communicate with a rack manager to actively limit or cap the power delivery to a storage server at a low-power level.

In some examples, a control plane in communication with a server rack housing a plurality of computing devices may allow the computing devices to operate independently and unrestricted while the power draw of the computing devices remains below a device power threshold. In some embodiments, the device power threshold is based on a computing device power draw level at which the rack power supply can provide power to all computing devices in the rack. For example, if the power supply can provide a maximum of 2000 W, a device power threshold for a server rack with four computing device may be 500 W for each computing device, irrespective of the maximum draw for each computing device. When a first computing device exceeds the device power threshold, the control plane may assign a second computing device as a storage server to the first computing device, allowing the first computing device to operate above the device power threshold up to and including the maximum power draw of the first computing device, while the second computing device being assigned the low-power task of being a storage server the first computing device allows for capacity in the power supply to provide power to the first computing device.

In some examples, when the computing devices of the server rack are operating below a total power supply threshold value (e.g., the total rated value of the power supply for the server rack), the control plane may allow the plurality of computing devices to operate independently and unrestricted. When the total power draw of the plurality of computing devices is measured above a power threshold value of the power supply, the control plane may assign a second computing device as a storage server to the first computing device.

Figures 1, 7:
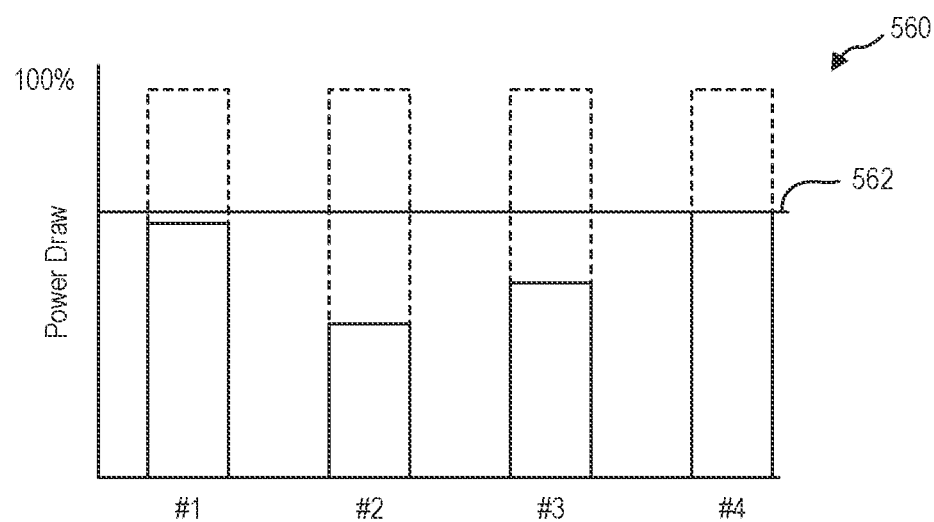
Figures 2, 7:
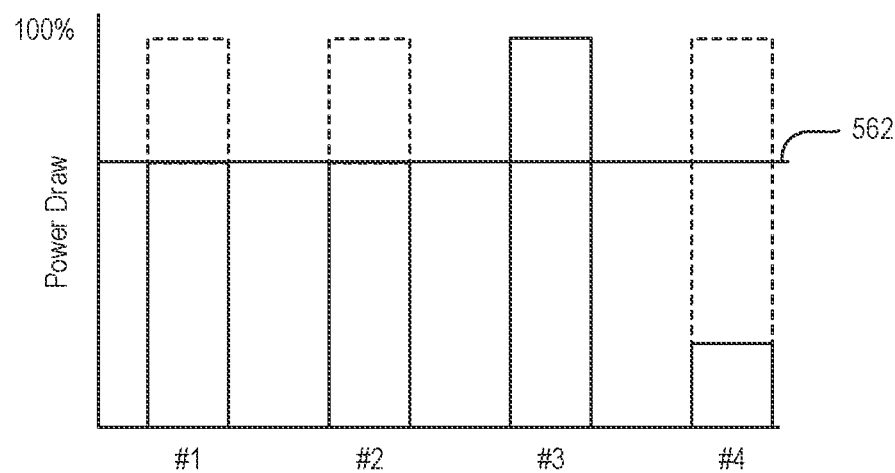

FIG. 7-1 is an example graph 560 of four computing device on a server blade (such as described in relation to FIG. 3), where all four computing devices are operating below a device power threshold value 562. All four computing devices may be allowed to operate independently and unrestricted. FIG. 7-2 illustrates the third computing device operating at an elevated power draw while running a more intensive application and exceeding the device power threshold value 562. The fourth computing device is allocated as a storage server to the third computing device to provide data to the third computing device while operating at a lower power draw.

Figure 8:
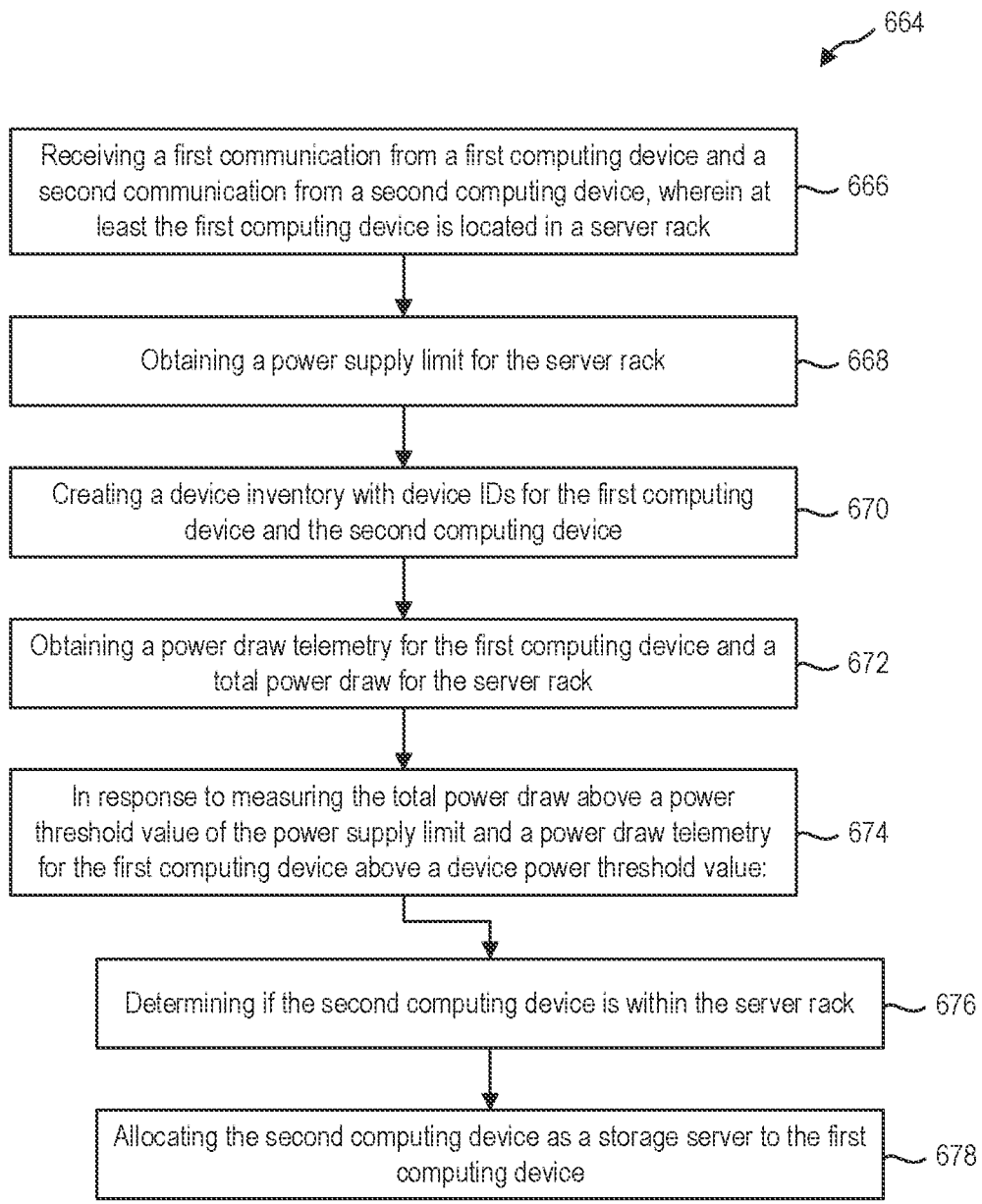
FIG. 8 is a flowchart illustrating another method of data management in a datacenter, according to at least some embodiments of the present disclosure.

FIG. 8 is a flowchart illustrating another method of managing data and processing resources in a datacenter. Some embodiments of a method 664 include creating or obtaining a device inventory. In some embodiments, the device inventory is created by the control plane receiving a first communication from a first computing device and a second communication from a second computing device, wherein at least the first computing device is located in a server rack at 666. The first communication includes a device ID and network location for the first computing device, and the second communication includes a device ID and network location for the second computing device.

The method includes obtaining a power supply limit for the server rack at 668. The power supply limit is the maximum electrical power the server rack can provide to the computing devices and/or electronic devices of the server rack. The control plane can create a device inventory with device IDs for the first computing device and second computing device at 670 when at least one of the computing devices is in the rack powered by the power supply.

The method 664 further includes obtaining a power draw telemetry for the first computing device and a total draw for the server rack at 672. The control plane may compare the device power draw and/or the total power draw to a device power threshold value and/or a total power threshold value. When the first computing device is measured by the control plane to be drawing power above a threshold value at 674, the control plane may determine if the second computing device is local to the first computing device (e.g., within the server rack) at 676 and may allocate the second computing device as a storage server to the first computing device at 678.

Figure 9:
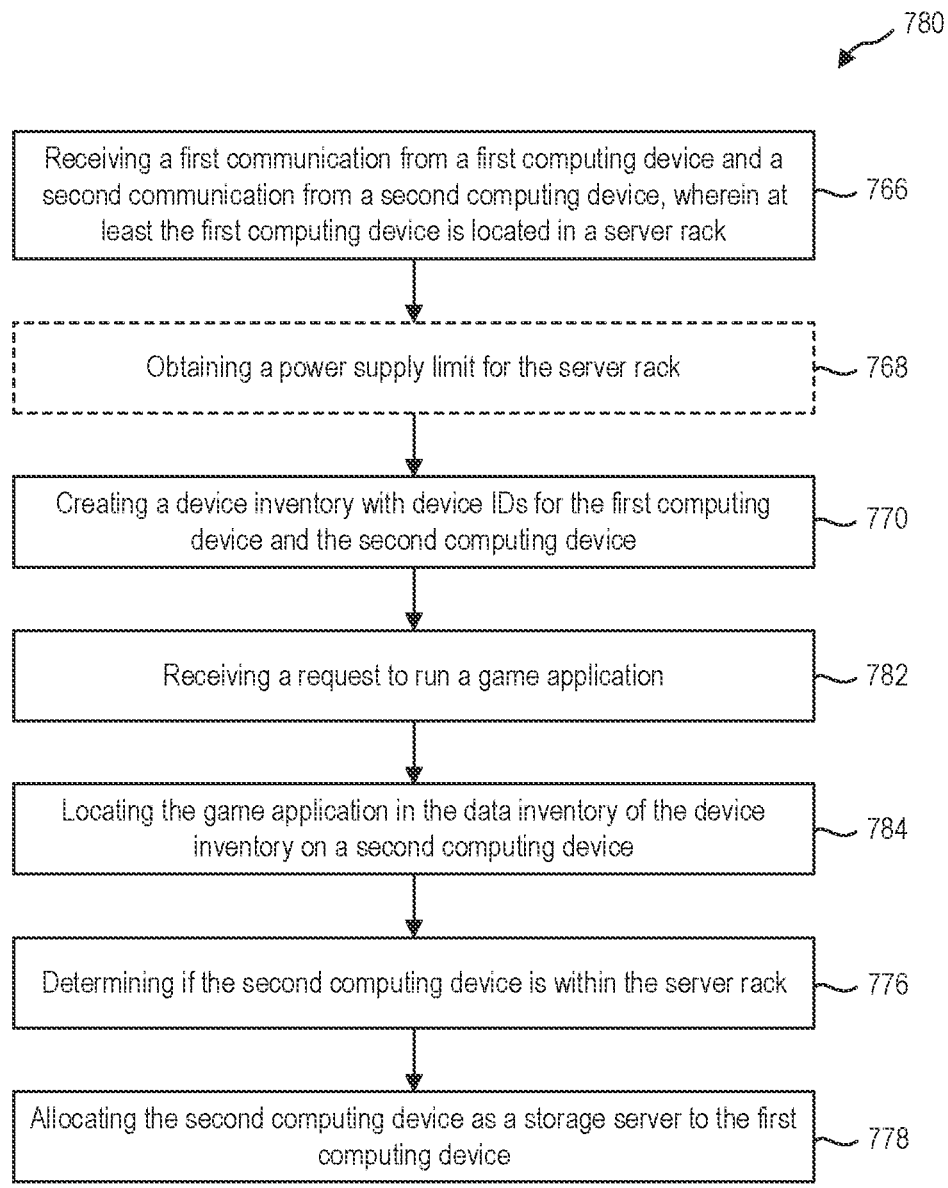
FIG. 9 is a flowchart illustrating a proactive method of data management in a datacenter, according to at least some embodiments of the present disclosure.

In some embodiments, a method of controlling data and compute resources in a datacenter includes allocating the storage server based on the data requested. FIG. 9 is a flowchart illustrating another method 780 of controlling data and compute resources in a datacenter. The method 780 may share at least some steps with other methods described herein. In some embodiments, a game application has an expected power draw. For example, a first game application may have an expected power draw that is 100% of the maximum power draw (e.g., above the device power threshold value) of the first computing device. A second game application may have an expected power draw that is 50% of the maximum power draw (e.g., below the device power threshold value) of the first computing device. When a user communicates with the first computing device and requests to run the second game application at 782, the control plane may evaluate a data inventory and determine whether the second game application is present on the first computing device. If the second game application is present, the first computing device can run the second game application for the user without the first computing device exceeding a device power threshold. If the second game application is not present on the hardware storage device of the first computing device, the control plane may locate the second game application on a second computing device at 784 and, after determining if the second computing device is local to the first computing device at 776, allocate the second computing device as a storage server to deliver the second game application to the first computing device at 778.

In some embodiments, when the user requests playing the first game application, which would cause the first computing device to operate above a device power threshold value, the control plane evaluates resource telemetry from the computing device in communication with the control plane and identifies an idle second computing device local to the first computing device. In some embodiments, the second computing device streams the game application to the first computing device. In other embodiments, the first computing device has the first game application stored locally (i.e., on a hardware storage device of the first computing device). In both examples, allocating the second computing device as a storage server to the first computing device limits the combined power draw of the first computing device and second computing device even when the first computing device is running at 100% power draw.

In at least one example, a remotely located user connects to a datacenter to play a video game that is run by and streamed from a computing device in the datacenter. The user may be connected to a first computing device in the datacenter and subsequently request to play a game application. In some embodiments, the game application is not present on a hardware storage device of the first computing device. A control plane may locate the game application on the hardware storage device of a second computing device and allocate the second device as a storage server for the first computing device. Instead of simply idling the second computing device, the first computing device and second computing device can, together, deliver a game application that is otherwise unavailable to the first computing device alone.

In some embodiments, the control plane may dynamically anticipate whether or not a user will request a software application or game application that will operate the computing device above the device power threshold value. For example, the control plane may access a log of user game history. The user may have a history of playing relatively low-power demand games or software applications that do not exceed the device power threshold value. In some examples, the user may request a game that, when other users play, often exceeds the device power threshold value.

In at least one embodiment, the control plane or other computing device in data communication with the control plane uses a machine learning (ML) model to dynamically create an expected power draw list based on the types of game applications and the measured power draws during previous play.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is training using a plurality of known power draw amounts for a specific game application.

INDUSTRIAL APPLICABILITY

In some embodiments, the computing devices of a server rack have an maximum power consumption that exceeds a power supply limit of the server rack. The computing devices, if all operating at maximum capacity, will require more power than the power supply of the server rack can provide, causing a reduction in performance or failure of the computing device. In a datacenter environment, remote users may be interacting with the computing devices in real-time. Degradation of performance and/or shutdown of the computing devices is therefore undesirable. To ensure a quality experience for users, conventional datacenters and/or server racks can power cap, throttle, or disable some devices to manage the power consumption of the server rack as a whole. However, in some instances, such as cloud-based gaming (such as AMAZON LUNA, GOOGLE STADIA, PLAYSTATION NOW, MICROSOFT XBOX CLOUD GAMING, etc.), application or data that is requested by the user is not stored in the integrated hardware storage at the computing device. Rather, under low-demand conditions, a second computing device may stream the application or other data to the first computing device, and the first computing device may run the application or process the data.

In some embodiments, the datacenter includes server blades in a climate-controlled room. The server blades are arranged in a row, where the row contains a plurality of server racks, each of which contain at a plurality of server blades, power supplies, networking devices, and other electronic devices. In some examples, the server blade includes a plurality of computing components. In some examples, the server computers are complete computers (e.g., each server computer can function as a standalone computer). In some examples, the server blades include one or more computing devices that can cooperate to provide scalable computational power.

The server row can include a row manager that is in communication with the server racks and/or rack manager of the server row. In some embodiments, the row manager controls computational loads, such as process allocations, of the server racks and/or server blades. In doing so, the row manager may control, at a high-level, the amount of power demanded of the power supply by the server blades of the server racks.

In datacenters where the server blades house compute power that would, when operating at or near compute capacity, exceed the capacity of the power supply, the row manager and/or rack manager would conventionally power down or cap one or more of the computing devices or server blades in the row. In some embodiments according to the present disclosure, one or more computing devices of the server rack or row may be allocated as a lower power demanding storage server to another computing device that is operating at or near compute capacity. The datacenter 100 can thereby use the power supply capacity, storage capacity, and compute capacity of the available devices more efficiently.

In some instances, the power supply may be capable of providing sufficient power to the server blades when the computing devices of the server blades 102 are operating at or near compute capacity, but the amount of heat generated by the server blades when operating at or near compute capacity may exceed the thermal management capacity of the datacenter or room.

In some embodiments, the row manager controls thermal management of the server racks and/or server computers. For example, the row manager can manage active thermal management for the server racks and/or server blades by changing fan speed or by controlling the flow rate of a cooling fluid for liquid cooling systems. In at least one example, the server row is at least partially cooled by a liquid cooling system that delivers cooling fluid to the server racks of the server row. The row manager is in communication with the cooling fluid pump to change or stop the flow of cooling fluid.

A server rack can support a plurality of server blades in the rack. The server computers may each have liquid cooling, such as localized immersion cooling for at least some electronic components of the server computer, or a cooling plate with recirculating cooling fluid to cool the electronic component(s) of the server computer. In some embodiments, the server blades or other electronic devices may be air-cooled, utilizing a cold aisle and a hot aisle that flow colder air from the cold aisle and evacuate hotter air from the electronic devices through the hot aisle. The air flows from the cold aisle to the hot aisle based on air pressure differentials established by pumps or fans of the thermal management system in series with the cold aisle 118 and the hot aisle.

In some embodiments, the electronic components, such as server blades, of the server rack are in data communication with a rack manager. The rack manager may control power delivery to the server blades or other electronic components. In conventional server arrays, the rack manager may communicate with the server blades or other electronic components to disable, power cap, or throttle the server blades or other electronic components and manage power draw. The rack manager, in some embodiments, is also in communication with a cooling fluid pump that moves cooling fluid to one or more server computers or other electronic components in the server rack.

A control plane or other service manager may be in data communication with one or more of the server blades (and components thereof), the power supply, the network device, the row manager, and/or rack manager(s). In some embodiments, the control plane is provided by a processor and a hardware storage device. The processor may receive information from the server blades (and components thereof), the power supply, the network device, the row manager, and/or rack manager(s), that allow the processor to perform any of the methods described herein. In some embodiments, the devices in communication with the control plane may receive instructions from the control plane to alter the operation and/or communication of the devices. For example, the control plane may communicate with the server blades and/or the computing devices of the server blades to efficiently use the data and compute resources available on the server blades.

The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media.

The control plane may be local to the datacenter (e.g., on site at the datacenter), local to the row, or local to the rack to allow communication between the server blades and the control plane. In some embodiments, the control plane is remote to the datacenter, allowing the control plane to be housed and/or controlled remotely, such as from a regional datacenter that communicates with the local datacenter.

In some embodiments, a computing device includes at least a processor, a hardware storage device, and a network device. In some examples, the computing device may include additional or dedicated components such as a graphical processing unit (GPU), a central processing unit (CPU), system memory, graphical memory, audio processing unit, physics processing unit, wireless communication devices, or other electronic components or ASICs. The processor is in data communication with the hardware storage device to execute instructions stored on the hardware storage device.

In some embodiments, the computing device is or includes gaming computing hardware. For example, the computing device may include one or more processors or hardware storage devices specified in retail commodity video game hardware. The current generation of retail commodity video game hardware (e.g., SONY PLAYSTATION 5, MICROSOFT XBOX SERIES X, etc.) includes high-speed solid-state storage, such as NVMe storage. The NVMe storage is rated for transfers rates, both read and write speeds, that allow the game applications intended for the retail commodity video game hardware to run properly. In other examples, the CPU and/or GPU of the computing device may be the same or similar CPU and/or GPU found in the retail commodity video game hardware to allow the game applications intended for the retail commodity video game hardware to run properly.

However, while the NVMe hard drives allow for high data transfer rates, NVMe hard drives have a relatively low storage capacity compared to other forms of data storage, such as magnetic hard disk drives. Therefore, the individual computing device may be limited in the total storage capacity, and hence the variety of content available on the computing device. Similarly, the CPU and/or GPU may have a sufficiently computing capacity to execute the game applications intended for the retail commodity video game hardware, while a power supply of a server rack is unable to provide sufficient power for a plurality of computing devices in the server rack.

The plurality of computing devices, while performing less-demanding tasks or less-demanding game applications, may all execute instructions stored locally on a hardware storage device of the computing device and remain independent of other computing devices. For example, some game applications do not require the processor and/or GPU of the computing device to operate at or near power consumption capacity. Each computing device may, in such instances, be allowed to operate independently, as the total power demands of the computing devices remains below the power supply limit.

While the present disclosure describes game applications and gaming usages, it should be understood that the systems and methods described herein are applicable to any use case that requires high computational throughput with scalable storage solutions. For example, machine learning, medical applications, or research applications may require high data throughputs to a powerful compute node that would otherwise be bottlenecked by remote or networked storage devices. To provide high data transfer rates, physically co-locating the computing devices can allow for faster communication rates than accessing the data remotely.

A server rack may include a plurality of server blades, which each have a plurality of computing devices thereon. The combined power demands of the computing devices may exceed the power supply limit of a conventional server rack power supply. In conventional instances, the rack manager of the rack may throttle or disable one or more of the computing devices available on the rack. However, data stored on the hardware storage device of a second computing device may include a game application or data needed by the first computing device. In such instances, the rack manager disabling the second computing device to limit power consumption would also impair the functionality of the first computing device for a user connected to the datacenter.

In some embodiments, a first computing device includes a processor, a hardware storage device, a network device, and a GPU. The processor is in data communication with the hardware storage device to execute instructions stored on the hardware storage device. The second computing device includes a processor, a hardware storage device, a network device, and a GPU. The processor is in data communication with the hardware storage device to execute instructions stored on the hardware storage device.

The first computing device may access data, such as a game application other software application, or other data, present on the hardware storage device of the second computing device through the network devices of the first computing device and second computing device, respectively. The processor of the first computing device may execute a game application stored on the hardware storage device of the second computing device without first downloading the game application to hardware storage device of the first computing device. Thereby, the first computing device, when the first computing device and second computer device are power constrained by the rack power supply, may provide all of the content of both hardware storage devices while remaining in the power envelope of the rack power supply.

In some embodiments, the bandwidth in and out of the server rack is less than the total of each blade server in the server rack. Therefore, communication within the server blades and between server blades within a rack may encounter less networking bottlenecks than communication between server racks. In at least one example, each blade server has networking bandwidth to support up to 25 Gbps of total data communication to and from the server blade and the devices thereon, while the server rack has a bandwidth cap of 100 Gbps.

In some embodiments, a control plane can manage virtual machine (VM) and/or process allocation to the computing devices in the server rack or row. In managing the VM and process allocation, the control plane can create a device inventory based on the device identification (IDs) of the computing devices in communication with the control plane. In some embodiments, the device inventory can further include a data inventory to allows for the control plane to know what game applications, software application, or other data is physically stored on which devices in the device inventory.

The device inventory may include device IDs and associated device locations for the devices in the network and/or within the datacenter. The device locations include network location information related to the physical proximity of the devices in the device inventory. For example, a first computing device and a second computing device may be identified within the device inventory as being located on the same server blade, in the same rack, in the same row, in the same datacenter, etc.

The data inventory may include software IDs for one or more game applications or software applications. The data inventory may further include file names, directory names, or other identifying information for the data stored on the devices in the device inventory. The data inventory can, therefore, associate the data and/or applications with a network or physical location of the device on which the data is stored. The control plane can determine whether requested data or a requested application is present on the devices controlled by the control plane, and the control plane can identify the network or physical location of requested data or application. If the requested data or application is available on a hardware storage device, the control plane may use the device inventory to identify the locations of the requested data or application and identify the closest computing device with the requested data or application relative to a computing device that is allocated to a VM connected to a user.

System telemetry can assist the control plane in VM and process allocation of the computing devices and data stored thereon. For example, the control plane or other management service may communicate with the computing devices and power supply of the rack to measure one or more real-time properties of the computing device(s), the power supply, network switch, or other electronic devices of the server rack, row, or datacenter. The telemetry can include power draw from the computing devices, processor load, memory usage, network usage, temperature, or other properties of the system that reflect performance and operation. In some embodiments, the computing devices may communicate to the control plane the current application or applications running on the computing device. The telemetry can inform the control plane which devices are consuming the greatest amount of power and which devices have capacity available for processing. The power draw information can allow the control plane to determine when the power draw of the computing device, a server blade, or all of the electronic devices in a rack is approaching or exceeding a power threshold value.

In some embodiments, the telemetry may include network usage. For example, the network switch of the server rack may have less outgoing network connections than internal connections. Therefore, determining which computing devices have the highest network usage can allow the control plane to determine which computing devices to allocate for local (e.g., within the server rack) communication with other computing devices.

In some embodiments, the telemetry includes temperature data that is collected from one or more thermal sensors associated with the server rack, a server blade, a computing device, or a component of a computing device. The temperature data can allow the control plane to determine when the environment or specific components of a computing device are approaching or exceeding a thermal threshold value.

The control plane may communicate with a BMC of the server blade. The BMC can monitor and communicate information about server blade status, such as wattage, voltage, temperature, fan speeds, software functions, environmental conditions, etc. while also providing functionalities such as logging, power management, and network communications. In some embodiments, the control plane communicates with the BMC to adjust power to or provide instructions to one or more of the computing devices. In some embodiments, the control plane receives at least a portion of the telemetry from the BMC.

In some embodiments, a method of controlling data and compute resources in a datacenter includes allocating a computing device in a server rack to be a storage server for another computing device in the server rack. For example, in a server rack having a first computing device and a second computing device, where both the first computing device and the second computing device have a processor, a hardware storage device, and a network device to allow communication therebetween, the method includes obtaining a power supply limit for a rack power supply. The rack power supply delivers electrical power to the computing devices housed therein, and the rack power supply limit is a maximum wattage that the power supply can sustain to the devices therein. If the demands of the devices in the server rack exceed the power supply limit, the power will be insufficient to support the operation of at least one of the computing devices, causing the computing device(s) to slow, shut down, or fail.

In some embodiments, obtaining the power supply limit includes accessing or parsing a device ID of the power supply or device inventory. The power supply may have a rate power supply limit that is provided by the power supply in communication with a control plane or rack manager. In some embodiments, the power supply limit is a recorded or operator-provided value that is set based on the devices powered by the power supply. For example, the operator-provided limit may be less than the rated power supply limit to provide an additional safety factor when operating the server rack.

The method further includes measuring a resource telemetry for the first computing device and second computing device in the server rack. For example, the resource telemetry may measure or otherwise provide to the control plane a total power draw for the server rack, a power draw from a server blade, a power draw from a specific computing device, or power draw from a specific component of a computing device. In some embodiments, the resource telemetry may measure or otherwise provide to the control plane a temperature of the room, the row, the rack, or one or more computing devices. In some embodiments, the resource telemetry may measure or otherwise provide to the control plane processor usage, memory usage, network usage, or other performance metrics of one or more computing devices.

The resource telemetry may be compared to the power supply limit and, when the resource telemetry indicates that at least one measured property is within a threshold value of a limit, the method includes allocating the second computing device of the server rack to be a storage server with data thereon accessible by the first computing device. For example, when a measured power draw of the server rack is measured within a threshold value of the power supply limit, the second computing device is allocated to be a storage server to the first computing device. As a storage server has lower power demands than a compute node, the average power draw of the computing devices in the server rack is limited.

In another example, a method includes allocating a second computing device to provide data to a first computing device as a storage server to limit power consumption while also leveraging the hardware resources available in the server rack. In some embodiments, the method includes a control plane receiving a communication from a computing device where the communication includes a device ID. The control plane receives the communication and records the device ID and other information in the communication into a device inventory. The device inventory allows the control plane to identify the relative location and resources available in various devices in data communication with the control plane. In some examples, a computing devices sends a communication to the control plane upon startup of the computing device. In at least one example, a server rack with a plurality of computing devices is initialized together, allowing the control plane to receive communications from the plurality of computing devices and create a device inventory for the plurality of computing devices in the server rack.

The communication to the control plane may further includes a software registry, library, or log, that informs the control plane of the applications or other data available on the computing device(s). For example, upon startup, a computing device may communicate with the control plane and inform the control plane of the computing device's network location, physical location, processing resource information, and what applications are stored thereon. The software information allows the control plane to create a data inventory based, in some instances, on the device inventory. The data inventory and device inventory may allow the control plane to find a requested software application or other data on a hardware storage device of the second computing device and instruct the second computing device to stream the application to the first computing device. The first computing device may thereby run a software application not present in the hardware storage device of the first computing device from a local computing device to minimize lag.

In some embodiments, the method includes receiving a request from the first computing device to access requested data. The control plane or other management service may then locate the requested data in the data inventory and allocate the second computing device (e.g., the computing device having the request data stored thereon) as a storage server to the first computing device. In some embodiments, the method further includes running the requested application or processing the requested data with the first computing device.

The requested data may be a software application, such as a game application, that the first computing device can run while the second computing device is allocated as a storage server to the first computing device. For example, when the first computing device and second computing device are present in the same rack or on the same server blade, the first computing device may be able to run the game application from the hardware storage device of the second computing device as though the game application were stored locally on the hardware storage device of the first computing device. Thereby, the second computing device, which would otherwise be idle or disabled by the rack manager to limit total power draw on the rack power supply, can be beneficially used as a relatively low-power storage server to allow another computing device to have, effectively, expanded storage.

In some embodiments, the device power draw of each computing device in a server rack and/or in a device inventory is used to determine when another computing device should be allocated as a storage server. In some examples, allocation of a computing device as a storage server inherently limits the power draw of that computing device, as the possible computational tasks of the storage server draw a comparatively low amount relative to a compute node running a game application. In other examples, the control plane may communicate with a rack manager to actively limit or cap the power delivery to a storage server at a low-power level.

In some examples, a control plane in communication with a server rack housing a plurality of computing devices may allow the computing devices to operate independently and unrestricted while the power draw of the computing devices remains below a device power threshold. In some embodiments, the device power threshold is based on a computing device power draw level at which the rack power supply can provide power to all computing devices in the rack. For example, if the power supply can provide a maximum of 2000 W, a device power threshold for a server rack with four computing device may be 500 W for each computing device, irrespective of the maximum draw for each computing device. When a first computing device exceeds the device power threshold, the control plane may assign a second computing device as a storage server to the first computing device, allowing the first computing device to operate above the device power threshold up to and including the maximum power draw of the first computing device, while the second computing device being assigned the low-power task of being a storage server the first computing device allows for capacity in the power supply to provide power to the first computing device.

In some examples, when the computing devices of the server rack are operating below a total power supply threshold value (e.g., the total rated value of the power supply for the server rack), the control plane may allow the plurality of computing devices to operate independently and unrestricted. When the total power draw of the plurality of computing devices is measured above a power threshold value of the power supply, the control plane may assign a second computing device as a storage server to the first computing device.

Some embodiments of a method include creating or obtaining a device inventory. In some embodiments, the device inventory is created by the control plane receiving a first communication from a first computing device and a second communication from a second computing device, wherein at least the first computing device is located in a server rack. The first communication includes a device ID and network location for the first computing device, and the second communication includes a device ID and network location for the second computing device.

The method includes obtaining a power supply limit for the server rack. The power supply limit is the maximum electrical power the server rack can provide to the computing devices and/or electronic devices of the server rack. The method further includes obtaining a power draw telemetry for the first computing device and a total draw for the server rack. The control plane may compare the device power draw and/or the total power draw to a device power threshold value and/or a total power threshold value. When the first computing device is measured by the control plane to be drawing power above a threshold value, the control plane may determine if the second computing device is local to the first computing device (e.g., within the server rack) and may allocate the second computing device as a storage server to the first computing device.

In some embodiments, a method of controlling data and compute resources in a datacenter includes allocating the storage server based on the data requested. In some embodiments, a game application has an expected power draw. For example, a first game application may have an expected power draw that is 100% of the maximum power draw (e.g., above the device power threshold value) of the first computing device. A second game application may have an expected power draw that is 50% of the maximum power draw (e.g., below the device power threshold value) of the first computing device. When a user communicates with the first computing device and requests to run the second game application, the control plane may evaluate a data inventory and determine whether the second game application is present on the first computing device. If the second game application is present, the first computing device can run the second game application for the user without the first computing device exceeding a device power threshold. If the second game application is not present on the hardware storage device of the first computing device, the control plane may locate the second game application on a second computing device and allocate the second computing device as a storage server to deliver the second game application to the first computing device.

In some embodiments, when the user requests playing the first game application, which would cause the first computing device to operate above a device power threshold value, the control plane evaluates resource telemetry from the computing device in communication with the control plane and identifies an idle second computing device local to the first computing device. In some embodiments, the second computing device streams the game application to the first computing device. In other embodiments, the first computing device has the first game application stored locally (i.e., on a hardware storage device of the first computing device). In both examples, allocating the second computing device as a storage server to the first computing device limits the combined power draw of the first computing device and second computing device even when the first computing device is running at 100% power draw.

In at least one example, a remotely located user connects to a datacenter to play a video game that is run by and streamed from a computing device in the datacenter. The user may be connected to a first computing device in the datacenter and subsequently request to play a game application. In some embodiments, the game application is not present on a hardware storage device of the first computing device. A control plane may locate the game application on the hardware storage device of a second computing device and allocate the second device as a storage server for the first computing device. Instead of simply idling the second computing device, the first computing device and second computing device can, together, deliver a game application that is otherwise unavailable to the first computing device alone.

In some embodiments, the control plane may dynamically anticipate whether or not a user will request a software application or game application that will operate the computing device above the device power threshold value. For example, the control plane may access a log of user game history. The user may have a history of playing relatively low-power demand games or software applications that do not exceed the device power threshold value. In some examples, the user may request a game that, when other users play, often exceeds the device power threshold value.

In at least one embodiment, the control plane or other computing device in data communication with the control plane uses a machine learning (ML) model to dynamically create an expected power draw list based on the types of game applications and the measured power draws during previous play.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is training using a plurality of known power draw amounts for a specific game application.

The present disclosure relates to systems and methods for balancing resource usage and data availability in a datacenter according to at least the examples provided in the sections below:

[A1] In some embodiments, a method for managing storage and computational resources in a datacenter includes obtaining a power delivery limit for a rack power supply delivering power to the plurality of computing devices and measuring a resource telemetry for the first computing device and second computing device in the server rack. In response to measuring a power draw of the server rack above a power threshold value of the power delivery limit, the method includes allocating the second computing device of the server rack as a storage server to the first computing device. The method occurs at a server rack including a plurality of computing devices. A first computing device and a second computing device are in network communication with one another. Each of the first computing device and second computing device include a processor and a hardware storage device.

[A2] In some embodiments, the first computing device and second computing device of [A1] have the same processor and same hardware storage device.

[A3] In some embodiments, the first computing device and second computing device of [A1] or [A2] include a graphical processing unit.

[A4] In some embodiments, the first computing device and second computing device of any of [A1] through [A3] are video game console hardware.

[A5] In some embodiments, the first computing device and second computing device of any of [A1] through [A4] are located on the same server blade.

[A6] In some embodiments, a control plane allocates the second computing device of any of [A1] through [A5] as a storage server.

[A7] In some embodiments, the method of any of [A1] through [A6] includes reducing power supply to the second computing device while the second computing device is allocated as the storage server.

[A8] In some embodiments, the method of any of [A1] through [A7] includes obtaining a thermal limit for the plurality of computing devices and, in response to measuring a temperature of the server rack above a thermal threshold value of the thermal limit, allocating the second computing device of the server rack as a storage server to the first computing device

[B1] In some embodiments, a method for managing storage and computational resources in a datacenter includes, at a control plane, receiving a first communication from a first computing device and a second communication from a second computing device. At least the first computing device is located in a server rack. The method further includes obtaining a power supply limit for the server rack, creating a device inventory with device IDs for the first computing device and second computing device, and obtaining a power draw telemetry for the first computing device and a total power draw for the server rack. In response to measuring the total power draw above a power threshold value of the power supply limit and a power draw telemetry for the first computing device above a device power threshold value, the method further includes determining if the second computing device is within the server rack and allocating the second computing device as a storage server to the first computing device.

[B2] In some embodiments, the method of [B1] further includes determining that the second computing device is idle before allocating the second computing device as a storage server to the first computing device.

[B3] In some embodiments, the method of [B1] or [B2] further includes calculating the device power threshold value based upon the device inventory for the server rack.

[B4] In some embodiments, the device inventory of any of [B1] through [B3] further includes a data inventory of data stored on a hardware storage device of at least one computing device of the plurality of computing devices.

[B5] In some embodiments, the method of [B4] further includes receiving a request from the first computing device for requested data not stored on the first computing device, locating the requested data in the data inventory, and allocating the second computing device as a storage server to the first computing device when the request data is present on the second computing device.

[B6] In some embodiments, the requested data of [B5] is a game application.

[B7] In some embodiments, the game application has an estimated resource usage above the device power threshold value.

[C1] In some embodiments, a system for managing storage and computational resources in a datacenter includes a control plane including a processor and hardware storage device in data communication with the processor. The hardware storage device has instructions stored thereon that, when executed by the processor, cause the control plane to receive a first communication from a first computing device and a second communication from a second computing device, where at least the first computing device is located in a server rack. The instructions further cause the control plane to create a device inventory with device IDs for the first computing device and second computing device and create a data inventory associated with the device inventory. The control plane receives a request from a user to play a game application at the first computing device, locates the game application on the second computing device, and allocates the second computing device as a storage server of the first computing device.

[C2] In some embodiments, the instructions of [C1] further cause the control plane to instruct the second computing device to stream the game application from the second computing device to the first computing device.

[C3] In some embodiments, the instructions of [C2] further cause the control plane to instruct the first computing device to execute the game application on the first computing device without downloading the entire game application.

[C4] In some embodiments, streaming the game application includes in [C2] includes loading a portion of the game application into RAM of the first computing device.

[C5] In some embodiments, the instructions of [C2] further cause the control plane to instruct the first computing device to stream video information of the executed game application to the user.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for managing storage and computational resources in a datacenter, the method comprising:
   at a server rack including a plurality of computing devices, including a first computing device and a second computing device in network communication with one another, each of the first computing device and second computing device having at least:
      a processor, and
      a hardware storage device:
   obtaining a power delivery limit for a rack power supply delivering power to the plurality of computing devices;
   measuring a resource telemetry for the first computing device and second computing device in the server rack; and
   in response to measuring a power draw of the server rack above a power threshold value of the power delivery limit: allocating the second computing device of the server rack as a storage server to the first computing device.

2. The method of claim 1, wherein the first computing device and second computing device have the same processor and the same hardware storage device.

3. The method of claim 1, wherein the first computing device and second computing device further include graphical processing units.

4. The method of claim 1, wherein the first computing device and second computing device are video game console hardware.

5. The method of claim 1, wherein the first computing device and second computing device are located on the same server blade.

6. The method of claim 1, wherein a control plane allocates the second computing device as the storage server.

7. The method of claim 1, further comprising reducing power supply to the second computing device while the second computing device is allocated as the storage server.

8. The method of claim 1, further comprising:
   obtaining a thermal limit for the plurality of computing devices; and
   in response to measuring a temperature of the server rack above a thermal threshold value of the thermal limit:
      allocating the second computing device of the server rack as a storage server to the first computing device.

9. A method for managing storage and computational resources in a datacenter, the method comprising:
   at a control plane:
      receiving a first communication from a first computing device and a second communication from a second computing device, wherein at least the first computing device is located in a server rack;
      obtaining a power supply limit for the server rack;
      creating a device inventory with device IDs for the first computing device and second computing device;
      obtaining a power draw telemetry for the first computing device and a total power draw for the server rack; and
      in response to measuring the total power draw above a power threshold value of the power supply limit and a power draw telemetry for the first computing device above a device power threshold value:
         determining if the second computing device is within the server rack, and
         allocating the second computing device as a storage server to the first computing device.

10. The method of claim 9, further comprising determining that the second computing device is idle before allocating the second computing device as a storage server to the first computing device.

11. The method of claim 9, further comprising calculating the device power threshold value based upon the device inventory for the server rack.

12. The method of claim 9, wherein the device inventory further includes a data inventory of data stored on a hardware storage device of at least one computing device of the plurality of computing devices.

13. The method of claim 12, further comprising receiving a request from the first computing device for requested data not stored on the first computing device;
   locating the requested data in the data inventory; and
   allocating the second computing device as a storage server to the first computing device when the request data is present on the second computing device.

14. The method of claim 13, wherein the requested data is a game application.

15. The method of claim 14, wherein the game application has an estimated resource usage above the device power threshold value.

16. A system for managing storage and computational resources in a datacenter, the system comprising a control plane including:
 a processor; and
 a hardware storage device in data communication with the processor, the hardware storage device having instructions stored thereon that, when executed by the processor, cause the control plane to:
 receive a first communication from a first computing device and a second communication from a second computing device, wherein at least the first computing device is located in a server rack;
 obtain a power supply limit for the server rack;
 create a device inventory with device IDs for the first computing device and second computing device;
 create a data inventory associated with the device inventory;
 receive a request from a user to play a game application at the first computing device;
 locate the game application on the second computing device; and
 in response to measuring a power draw of the server rack above a power threshold value of the power supply limit: allocate the second computing device as a storage server of the first computing device.

17. The system of claim 16, wherein the instructions further cause the control plane to instruct the second computing device to stream the game application from the second computing device to the first computing device.

18. The system of claim 17, wherein the instructions further cause the control plane to instruct the first computing device to execute the game application on the first computing device without downloading the entire game application.

19. The system of claim 17, wherein streaming the game application includes loading a portion of the game application into RAM of the first computing device.

20. The system of claim 17, further comprising streaming video information of the executed game application to the user.

* * * * *